(12) United States Patent
Westergaard Andersen

(10) Patent No.: US 11,130,638 B2
(45) Date of Patent: Sep. 28, 2021

(54) TWO PART SPROCKET WHEEL

(71) Applicant: Ammeraal Beltech Modular A/S, Vejle (DK)

(72) Inventor: Kenneth Westergaard Andersen, Kolding (DK)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 17/040,093

(22) PCT Filed: Mar. 21, 2019

(86) PCT No.: PCT/DK2019/050099
§ 371 (c)(1),
(2) Date: Sep. 22, 2020

(87) PCT Pub. No.: WO2019/179588
PCT Pub. Date: Sep. 26, 2019

(65) Prior Publication Data
US 2021/0024293 A1    Jan. 28, 2021

(30) Foreign Application Priority Data

Mar. 22, 2018  (DK) ............................ PA 2018 70185

(51) Int. Cl.
*B65G 23/06* (2006.01)
*B65G 23/04* (2006.01)
(Continued)

(52) U.S. Cl.
CPC ............. *B65G 23/06* (2013.01); *B65G 23/04* (2013.01); *B65G 39/02* (2013.01); *B65G 45/10* (2013.01);
(Continued)

(58) Field of Classification Search
CPC .... B65G 23/04; B65G 23/06; B65G 2207/30; B65G 2207/26; B65G 39/02; B65G 45/10;
(Continued)

(56) References Cited

U.S. PATENT DOCUMENTS 3,501,972 A * 3/1970 Morrow .................. F16H 55/30
474/95
5,469,958 A    11/1995 Gruettner
(Continued)

FOREIGN PATENT DOCUMENTS

CA    3032748 A1    2/2018
EP    1719718 A2    11/2006
(Continued)

*Primary Examiner* — James R Bidwell
(74) *Attorney, Agent, or Firm* — James Creighton Wray

(57) ABSTRACT

A two part sprocket wheel engages modular belt modules in a conveyor belt. The sprocket wheel's periphery elements' outer edges form a full circle. On each inner periphery four engagement ridges are provided. When the sprocket wheel is mounted around the axle, only the engagement ridges touch and engage the axle. The sprocket wheel construction between the engagement ridges is removed from the drive axle. It is possible to flush and clean the areas around the drive axle being partly covered by the sprocket wheel in an easy and accessible manner. The engagement ridges have a very limited engagement area in order to contact the drive axle and thereby convey the torque forces from the drive axle to the teeth of the sprocket wheel. The engagement ridges are in very firm engagement with the drive axles, such that no material may remain where the engagement ridges engage the drive axles.

7 Claims, 3 Drawing Sheets

(51) Int. Cl.
*B65G 45/10* (2006.01)
*B65G 39/02* (2006.01)

(52) U.S. Cl.
CPC ...... *B65G 2207/26* (2013.01); *B65G 2207/30* (2013.01); *B65G 2812/02148* (2013.01)

(58) Field of Classification Search
CPC ........... B65G 2812/02148; F16H 55/46; F16H 55/171
USPC ................................................. 198/834, 835
See application file for complete search history.

(56) References Cited

U.S. PATENT DOCUMENTS

| | | | |
|---|---|---|---|
| 5,833,562 A * | 11/1998 | Walker, Sr. | F16H 55/30 474/96 |
| 6,146,299 A * | 11/2000 | Harvey | F16H 55/12 474/95 |
| 10,238,035 B2 * | 3/2019 | Walters | F16H 57/035 |
| 2005/0199471 A1 * | 9/2005 | Barrett | B65G 45/10 198/495 |
| 2007/0161443 A1 | 7/2007 | Krisl | |
| 2014/0305241 A1 * | 10/2014 | Li | F16H 55/12 74/448 |
| 2015/0060242 A1 | 3/2015 | Carrara | |

FOREIGN PATENT DOCUMENTS

| EP | 2181947 A1 | 5/2010 |
|---|---|---|
| GB | 2321293 A | 7/1998 |
| KR | 200453781 Y1 | 5/2011 |

* cited by examiner

TWO PART SPROCKET WHEEL

This application claims the benefit of Danish Application No. PA 2018 70185 filed Mar. 22, 2018 and PCT/DK2019/050099 filed Mar. 21, 2019, International Publication No. WO 2019/179588 A1, which are hereby incorporated by reference in their entirety as if fully set forth herein.

FIELD OF THE INVENTION

The present invention is directed to a sprocket wheel and in particular a two part sprocket wheel with special hygienic features.

BACKGROUND OF THE INVENTION

Sprocket wheels are typically used in conveyor structures in order to transfer the drive forces from the drive to the conveyor belt and in particular the type of belts which are known as modular conveyor belts.

Modular conveyor belts of the type being assembled from a plurality of injection moulded belt links are used in a number of industries, and particularly in the food manufacturing industry special emphasis is put on the ability to be able to clean the conveying structure thoroughly in order to avoid contamination and the like from the food stuffs being transported on the conveyor and in particular from debris or other organic remains which may become stuck or hidden in the conveying structure as such.

For this purpose this type of conveyor structures shall be designed such that all parts of the conveyor are accessible in order to guarantee the thorough cleaning.

Another aspect with conveyor structures of this type is that if for some reason a breakdown in the structure should occur resulting in downtime for the production line, it is desirable to minimize this downtime by being able to replace the broken parts as quickly as possible.

It is already well-known in the art that if a conveyor belt as such breaks, it is possible to remove connection pins and replace broken connection pins or broken modular belt links and then reassemble the conveyor belt simply by inserting the connection pins again and thereby in a very easy and efficient manner repair the conveyor belt on site.

Another important part of the conveying structure is the sprocket wheels which are arranged on the drive axle. The sprocket wheels usually have means to engage the underside of the conveyor belt in order to transfer the drive forces from the drive motor via the drive axle and the sprocket wheel to the conveyor belt such that the conveyor belt moves in a desired direction.

Typically, the drive axle will have a polygon cross-section such as for example triangular or square. The sprocket wheel suitable to be mounted on the axle will have a corresponding aperture such that the sprocket wheels may be inserted over the axle with a close fit such that any torque in the axle will immediately be transferred to the edges of the aperture and thereby to the sprocket wheel as such.

If the sprocket wheel fails, for example by engagement teeth falling off or the sprocket wheel altogether breaking, it is necessary to disassemble the conveyor belt in order to be able to remove the drive axle and slide the broken sprocket wheel off the axle and reinsert a new sprocket wheel in the old one's place. After this, the drive motor and drive axle, sprocket wheels and conveyor belts have to be reassembled making the conveyor structure ready for conveying further materials.

In order to minimize the trouble caused by a broken sprocket wheel it is well-known to use sprocket wheels having a plurality of parts which are suitable to be assembled around the axle such that after having removed the broken sprocket wheel it is not necessary to dismantle the entire conveying structure, but the broken sprocket wheel may be replaced by a multi-part sprocket wheel which is assembled around the axle.

One example of such a multipart sprocket wheel is disclosed in EP2181947. This document disclose a construction wherein the two engagement ridges of different pairs are separated by a cut-out, and where parallel to the inner edge, a certain distance away from the aperture, assembly flanges are provided, where each assembly flange is provided with an aperture on either side of the web, where the aperture is surrounded by an upstanding circumferential ridge, the ridge on its distal end being provided with centering and engagement means, such that as two sprocket wheel parts are assembled to a sprocket wheel, the centering and engagement means on a first sprocket wheel part engages and centers the corresponding centering and engagement means on the second sprocket wheel part, whereby the apertures on the first and second sprocket wheel parts overlap, and assembly bolts may be inserted in order to connect and fix the two parts of the sprocket wheel to each other. This sprocket wheel, however, although easily fulfilling the requirements to replacing a broke sprocket wheel very easily and substantially without the use of any tools has a drawback for use in the food industry in that there are a number of closed or enclosed spaces which are very difficult to clean and as such may be found to be unsuitable in certain applications where high hygienic standards are required.

OBJECT OF THE INVENTION

Consequently, there is a need to provide a sprocket wheel construction which in addition to providing the advantages of a multipart sprocket wheel with respect to replacement, number of parts etc. also provides sufficient openings such that a thorough cleaning of the sprocket wheel construction may be carried out in order to ensure and attain the hygienic standard required by a multitude of applications, particularly in the food industry.

DESCRIPTION OF THE INVENTION

The present invention addresses this by providing a two part sprocket wheel adapted to engage modular belt modules in a conveyor belt, where said two part sprocket wheel comprises:

two periphery elements, each periphery element having an outer edge and inner edge and a web body there between, where sprocket teeth are provided on the outer edge, and where the inner edge has an engagement surface, and where each periphery element has means for being connected and fastened to and adjacent periphery element, such that the two periphery elements' outer edges form a full circle, said circle being arranged in a common plane, wherein centrally in the sprocket wheel an aperture is provided, said aperture being dimensioned to accommodate a substantially rectangular axle, where the longitudinal axis of the axle is perpendicular to the common plane of the two part sprocket wheel, where each part of the sprocket wheel (10, 11) has four engagement ridges, which engagement ridges when the sprocket wheel is mounted around the axle will engage the axle, where a first pair of ridges are arranged orthogonal to each other, and where a bent out section, connects the two engagement ridges, where a second pair of engagement ridges is mirrored the first pair, such that the two engagement ridges of different pairs being in the same plane are separated by a cutout, and where parallel to the inner edge, a certain distance away from the aperture, assembly flanges are provided, where each assembly flange is provided with an aperture on either side of the web, where said aperture is surrounded by an upstanding circumferential ridge, said ridge on its distal end being provided with centering and engagement means, such that as two sprocket wheel parts are assembled to a sprocket wheel, the centering and engagement means on a first sprocket wheel part engages and centers the corresponding centering and engagement means on the second sprocket wheel part, whereby the apertures on the first and second sprocket wheel parts overlap, and assembly bolts may be inserted in order to connect and fix the two parts of the sprocket wheel to each other.

With this construction the sprocket wheel only touches the drive axle with the engagement ridges and the sprocket wheel construction between the engagement ridges is removed from the drive axle such that it is possible to flush and clean the areas around the drive axle being partly covered by the sprocket wheel in an easy and accessible manner.

On the other hand, as the engagement ridges have a very limited engagement area in order to contact the drive axle and thereby convey the torque forces from the drive axle to the teeth of the sprocket wheel the engagement ridges are in very firm engagement with the drive axles such that no material may be lost or hidden in the areas where the engagement ridges are engaging the drive axles.

Furthermore, the circumferential ridges provided around the apertures in which the assembly belts are positioned maintain a distance between the two halves of the sprocket wheel again allowing for easy cleaning in these areas.

Furthermore, due to the pressure urged by the assembly bolts onto the centering and engagement means being part of the ridges foresees that these are completely closed volumes and therefore any debris or fluid will not be able to enter these connections and apertures suitable to accommodate the bolts. Consequently, a substantially completely closed-off space will be surrounding the connecting part of the bolts.

Further advantageous embodiments of the invention are evident from the appended dependent claims.

DESCRIPTION OF THE DRAWING

The invention will now be described with reference to the accompanying drawings wherein.

DETAILED DESCRIPTION OF THE INVENTION

Figure 1:
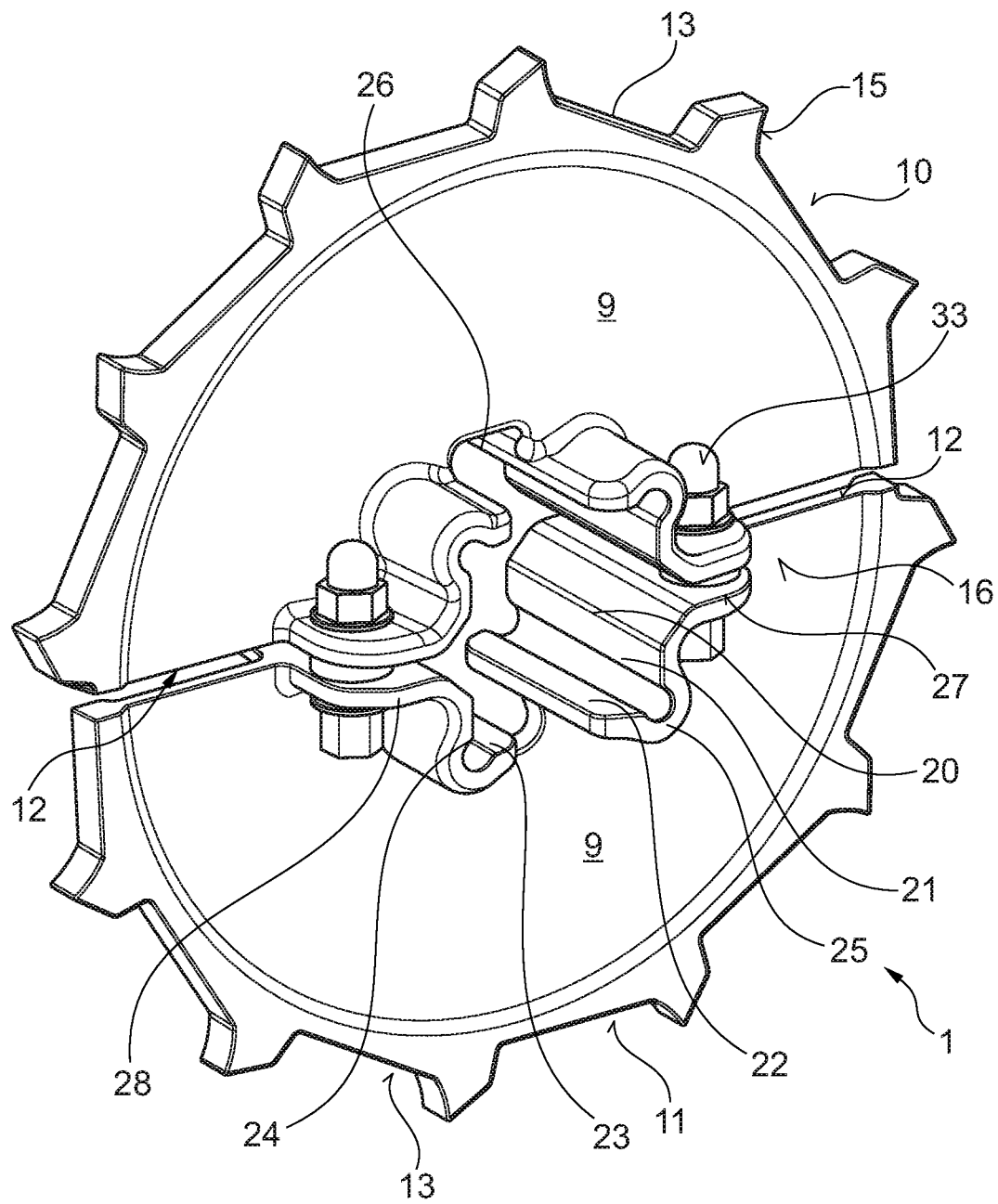
FIG. 1 illustrates an assembled two part sprocket wheel.

In FIG. 1 is illustrated an assembled two part sprocket wheel 1 according to the invention. The sprocket wheel 1 comprises two periphery elements 10, 11 where each periphery element has an outer edge 13 and an inner edge 12. Between the outer edge 13 and the inner edge 12 is defined a web which in the illustrated example is a solid section but in other applications the web 9 may be provided with cut-outs such that a spoke structure is present, but under any circumstances the web will be designed such that it can transfer the torque forces from the drive axle (not illustrated) to the drive teeth 15 in order to propel the conveying belt.

Each half of the two part sprocket wheel comprises means 16 suitable to connect the two periphery elements 10, 11 such that the two periphery elements' outer edges will form a substantially full circle which is comparable to a normal wheel. The periphery element's outer edge 13 of both two periphery elements will when they are assembled be situated in a common plane.

Centrally in the sprocket wheel is provided an aperture 20 which aperture has a size suitable to accommodate a drive axle (not illustrated). A suitable drive axle for driving the illustrated two part sprocket wheel will have a square cross-section such that the engagement means will as will be explained further below engage and come into contact with all four sides of the drive axle in order to transfer the torque forces from the drive axle to the conveyor belt.

In order to engage the drive axle the means 16 are provided in the shape of engagement ridges 21, 22, 23, 24. The engagement ridges are arranged in pairs such that each pair comprises two ridges arranged orthogonal to each other suitable to be arranged around a 90 degree corner of the drive axle. That is to say that once the drive axle is inserted through the aperture 20 in the sprocket wheel construction as depicted in FIG. 1, one engagement ridge 21 of a pair will engage one side of the corner whereas the other engagement ridge 22 of the same pair of engagement ridges 21, 22 will engage a side face arranged at a 90 degree angle to the side face of the drive axle from which the first engagement ridge 21 of the pair engages the drive axle. In this manner as depicted in FIG. 1 four pairs of engagement ridges will engage the drive axle with two engagement ridges on each side face of a rectangular drive axle.

Furthermore, two engagement ridges 21, 22 of a pair will be arranged with a bent-out section 25 between the ridges such that when the drive axle is inserted in the aperture 20 an opening will be provided by the bent-out section 25 making it possible to thoroughly clean this opening by flushing or spraying water through the space between the bent-out section 25 and the corner of the drive axle. See also FIG. 2*a*.

Furthermore, adjacent pairs of engagement ridges on each periphery element 11, 12 will be separated by a relatively large cut-out 26, again in order to make flushing or jets of water able to penetrate and thoroughly clean the area around the drive axle where the sprocket wheel is arranged.

In order to assemble the two periphery elements 10, 11 making up the two part sprocket wheel 1 assembly flanges 27, 28 are provided where in each assembly flange 27, 28 two apertures are provided, one on either side of the web 9. In this manner, once the periphery elements 10, 11 are brought up adjacent to each other the apertures in the assembly flanges 27, 28 on each periphery element 10, 11 will overlap whereby it is possible to insert for example a connection bolt 33 and tighten the two parts around the drive axle.

By tightening the bolts 33, i.e. two bolts on either side of the web, the engagement ridges 21, 22, 23, 24 of each periphery element 10, 11 will come into firm and solid engagement with the drive axle thereby being able to transfer the torque forces from the drive axle to the sprocket teeth 15 arranged along the outer edge 13 of the periphery elements 10, 11. At the same time the contact will hinder any foreign matter in being lodged between the axle and the engagement ridges.

Figure 2A:
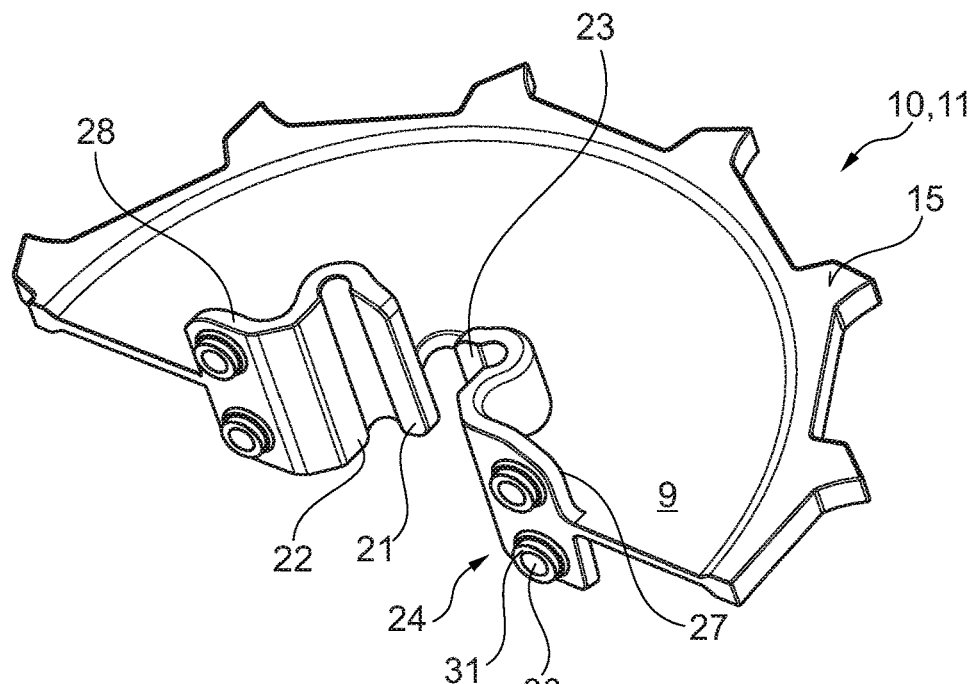
FIG. 2*a* illustrates one type of periphery elements.
Figure 2B:
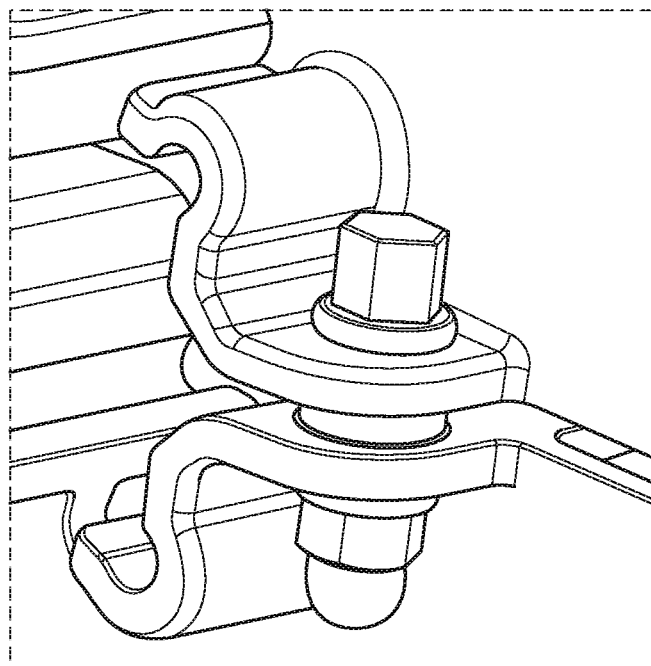
FIG. 2*b* illustrates two halves of the two part sprocket wheel overlapping each other.
Figure 2B:
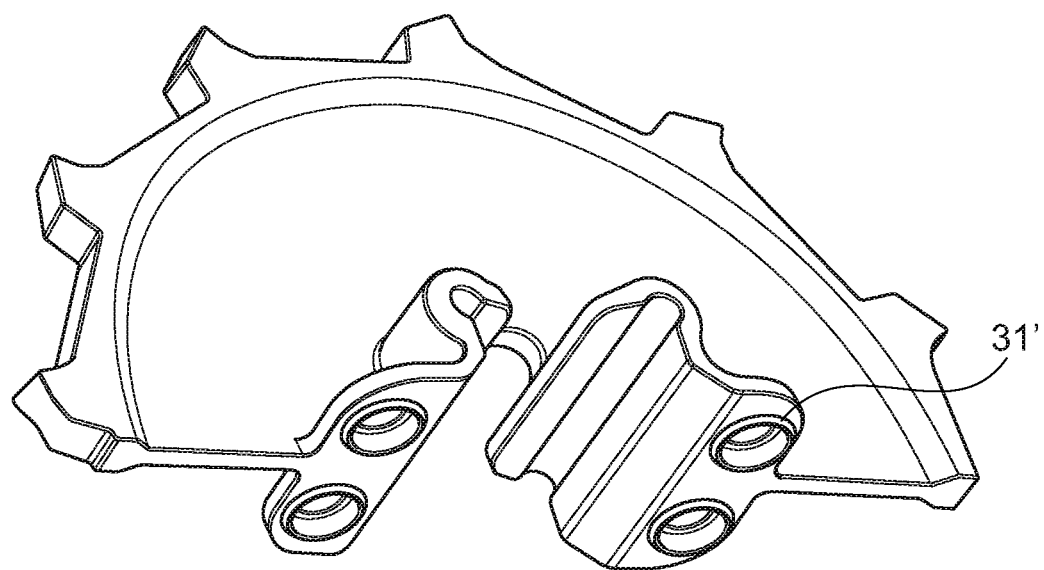

In FIG. 2 is illustrated a single periphery element 10, 11. The periphery elements are identical such that it is only necessary to manufacture one type of periphery element as they are symmetrical around a common plane passing through the web whereby it is possible to assemble two identical periphery elements 10, 11 into a two part sprocket wheel.

The periphery element 10, 11 illustrated in FIG. 2 has a web 9 and sprocket teeth 15 as already discussed above. Furthermore, the assembly flanges 27, 28 are clearly visible and it is clear that the assembly flanges as well as the engagement ridges 21, 22, 23, 24 extend a certain distance in the longitudinal direction of the drive axle (not illustrated) on either side of the web 9.

Furthermore, in the assembly flanges 27, 28 are provided apertures 30 which apertures are surrounded by upstanding circumferential ridges 31. The circumferential ridges may be provided on both assembly flanges 27, 28 or the circumferential flanges may be of different design on one of the flanges such that as will be explained with reference to FIG. 3 when the two upstanding circumferential ridges are assembled they will overlap each other in order to centre and close off the space created by the overlapping apertures in order to hinder any ingress of liquids or debris.

Figure 3:
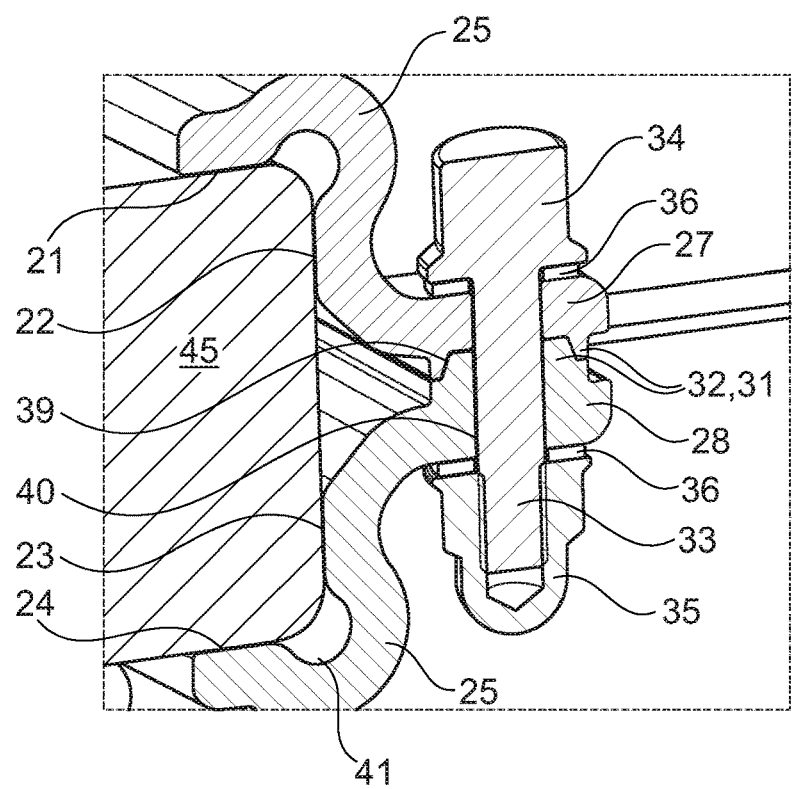
FIG. 3 illustrates a cross-section through an assembly of two sprocket wheel parts.

Alternatively, as is illustrated with reference to FIG. 2a one type of periphery elements 10, 11 may be provided with the upstanding circumferential ridge 31 whereas the other half of the two part sprocket wheel may be provided with circumferential ridges 31' having a larger diameter than the circumferential ridges 31 of the first part of the sprocket wheel whereby when assembled the larger diameters of upstanding circumferential ridges 31' as illustrated in FIG. 2b will overlap and enclose the circumferential ridges 31 of the first part thereby creating a closed space 40 as illustrated in FIG. 3.

Turning to FIG. 3 a cross-section through an assembly of two sprocket wheel parts is illustrated. In this cross-section part of the drive axle 45 is illustrated and it is clear that the engagement ridges 21, 22, 23, 24 are in close contact with the drive axle 45.

The bent-out section 25 clearly provides a relatively large opening 41 which may easily be cleaned.

Furthermore, the assembly flanges 27, 28 including the centering and engagement means 32, for example in the shape of upstanding circumferential ridges 31 are clearly visible. Furthermore, a bolt 33 is illustrated having a head section 34 and provided with a nut 35 such that by turning the nut relative to the thread provided on the bolt the two assembly flanges 27, 28 will be urged towards each other thereby clamping the drive axle by means of the engagement ridges 21, 22, 23, 24 into a firm and torque conveying engagement.

In order to foresee that the apertures provided in order to accommodate the bolt 33 do not accumulate debris or fluid, gaskets or seals 36 may be provided between the head and nut respectively and the assembly flanges 27, 28. Likewise, a further seal 39 may be provided between the centering and engagement means 32 in order to seal off the space 40.

As explained above an easy-to-clean and hygienically acceptable two part sprocket wheel construction is provided by the present invention.

The invention claimed is:

1. Two part sprocket wheel (1) adapted to engage modular belt modules in a conveyor belt, where the two part sprocket wheel (1) comprises:
two periphery elements (10, 11), each periphery element (10,11) having an outer edge (13) and inner edge (12) and a web body (9) there between, where sprocket teeth (15) are provided on the outer edge (13), and where the inner edge (12) has an engagement surface, and where each periphery element (10, 11) has engagement ridges (16) for being connected and fastened to and adjacent periphery element (10, 11), such that the two periphery elements' outer edges (13) form a full circle, the circle being arranged in a common plane, wherein centrally in the sprocket wheel (1) an aperture (20) is provided, the aperture (20) being dimensioned to accommodate a substantially rectangular axle, where the longitudinal axis of the axle is perpendicular to the common plane of the two part sprocket wheel (1), where each part of the sprocket wheel (10, 11) has four engagement ridges (21, 22, 23, 24), which engagement ridges (21, 22, 23, 24) when the sprocket wheel is mounted around the axle will engage the axle, where a first pair of ridges (21, 22) are arranged orthogonal to each other, and where a bent out section (25), connects the two engagement ridges (21, 22), where a second pair of engagement ridges (23, 24) is mirrored the first pair (21, 22), such that the two engagement ridges (22, 23) of different pairs being in the same plane are separated by a cut-out (26), and where parallel to the inner edge, a certain distance away from the aperture (20), assembly flanges (27, 28) are provided, where each assembly flange is provided with an aperture (30) on either side of the web (9), where the aperture (30) is surrounded by an upstanding circumferential ridge (31), the ridge on its distal end being provided with centering and engagement elements (32), such that as two sprocket wheel parts (10, 11) are assembled to a sprocket wheel (1), the centering and engagement elements (32) on a first sprocket wheel part (10) engages and centers the corresponding centering and engagement elements (32) on the second sprocket wheel part (11), whereby the apertures (30) on the first and second sprocket wheel parts (10, 11) overlap, and assembly bolts (33) may be inserted in order to connect and fix the two parts of the sprocket wheel to each other.

2. Two part sprocket wheel (1) according to claim 1, wherein the engagement ridges (21, 22, 23, 24) extend a certain determined distance perpendicularly on either side of the web (9), a certain determined distance.

3. Two part sprocket wheel (1) according to claim 1 wherein the circumferential ridges (31) create a distance between the inner edges (12) and the assembly flanges (27, 28).

4. Two part sprocket wheel (1) according to claim 1, wherein the bent out sections (25) have a radius of between 5 mm and 25 mm.

5. Two part sprocket wheel (1) according to claim 1, wherein the cut-out (26) separate adjacent ridges by between 5 mm and 40 mm, and that the cut-out (26) radially extends between 5 mm and 40 mm from the plane of the ridges (22, 23).

6. Two part sprocket wheel (1) according to claim 1, wherein the assembly bolt (33) comprises a head section (34) and a nut (35), and where a resilient gasket (36) is provided between the head section (34) and the assembly flange (27) and the nut (35) and the assembly flange (27).

7. Two part sprocket wheel (1) according to claim 1, wherein a gasket or seal (39) is provided between the centering and engagement elements (32) of the two sprocket wheel parts, when assembled.

* * * * *